Oct. 1, 1968   J. I. SCHWARTZ   3,403,547
COMPENSATED ELECTROMAGNETIC VELOCITY TRANSDUCER
Filed May 25, 1965   2 Sheets-Sheet 1

INVENTOR.
JOSEPH I. SCHWARTZ
BY *Hodges*
ATTY.
*Melvin Kraus*
AGENT.

Oct. 1, 1968  J. I. SCHWARTZ  3,403,547
COMPENSATED ELECTROMAGNETIC VELOCITY TRANSDUCER
Filed May 25, 1965                    2 Sheets-Sheet 2

INVENTOR.
JOSEPH I. SCHWARTZ
BY
ATTY.
AGENT.

United States Patent Office 3,403,547
Patented Oct. 1, 1968

3,403,547
COMPENSATED ELECTROMAGNETIC
VELOCITY TRANSDUCER
Joseph I. Schwartz, Baltimore, Md., assignor to the United States of America as represented by the Secretary of the Navy
Filed May 25, 1965, Ser. No. 458,794
1 Claim. (Cl. 73—71.2)

ABSTRACT OF THE DISCLOSURE

This disclosure relates to an electromagnetic velocity transducer for measuring the velocity of a vibrating specimen. The probe assembly, which is vibrated by the specimen, yields an erroneous signal due ot the motion of the magnetic case. This erroneous signal comprises a first waveform, which is the motion of the case, and a second waveform which is the motion of the probe. A compensating coil assembly is mechanically and electrically adjusted to yield a third waveform which is substantially identical to the motion of the case (the first waveform) but 180° out of phase with the motion of the case. The third waveform is then vectorially combined with the first and second waveforms (the output signal from the probe assembly) to thereby substantially cancel the erroneous first waveform and thereby yield a resultant signal having a waveform substantially the same as the second waveform.

The invention described herein may be manufactured and used by or for the Government of the United States of America for governmental purposes without the payment of any royalties thereon or therefor.

The present invention relates to transducers and more particularly to a compensated probe type of electromagnetic velocity transducer.

In the field of transducers, it has been the general practice to measure the vibration velocity of a vibrating body by bringing the transducer probe tip into contact with the vibrating body. If an electronic integration or differentiation of the output is then performed, the resulting signal will be respectively proportional to the displacement or acceleration of the vibrating body. Although such prior art devices have served the purpose, they have not proved satisfactory under all conditions of service, for the reason that the generated voltage is proportional to the relative velocity difference between the transducer probe and its housing. In order to measure the vibration velocity seen by the probe tip, i.e., that of the vibrating body, then the transducer housing must be attached to something which is not executing vibratory motions. Although such a situation can be achieved theoretically, in practice it is impossible to obtain. Hence, the resulting voltage output is not purely a function of the probe velocity alone.

The general purpose of this invention is to provide a compensated probe type of electromagnetic velocity transducer which embraces all of the advantages of similarly employed velocity transducer devices and which possesses none of the aforedescribed disadvantages. In order to obtain this, the present invention contemplates the provision of a compensating assembly exhibiting a motion proportional to the housing motion, whereby the output signal from the compensating assembly when properly connected to the original output signal compensates for the error due to the housing motion.

An object of the present invention is the provision of a probe type of electromagnetic velocity transducer providing an output which is purely a function of the probe velocity.

Another object is to provide a compensating assembly exhibiting a motion proportional to the housing motion.

The further object of this invention is to provide a compensated output signal which compensates for the error due to housing motion.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
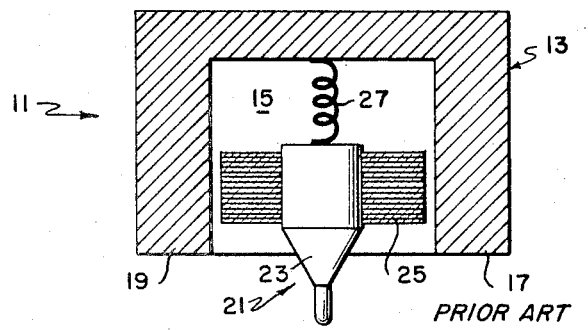
FIG. 1 is a cross-sectional view of a prior art electromagnetic velocity transducer.

Now referring to FIG. 1 which is a prior art embodiment, there is shown an electromagnetic velocity transducer 11 having a housing or case 13 provided with a recess portion or slot 15 therein. The recess portion is provided with a magnetic assembly comprising opposing magnetic pole pieces of opposite polarity 17 and 19 for providing a magnetic field across the air gap of the recess 15. A probe assembly 21 having a probe tip 23 and a coil 25 affixed thereto is positioned within the recess by resilient means such as spring 27 which may also be used as a guiding element. The probe tip is adapted to be placed in contact with a vibrating specimen and may take any suitable form therefor. The probe assembly is positioned within the recess 15 for vertical reciprocal movement therein and when the probe tip 23 is in contact with a vibrating body, the coil 25 provides an output signal proportional to the velocity of motion of the vibrating body but including an error component due to the housing motion, since for this type of electromagnetic velocity transducer the housing motion and the magnet motion are identical.

Electromagnetic velocity transducers operate on the principal that a conductor moving in a magnetic field or a magnetic field moving past a conductor will generate a voltage proportional to the velocity of motion. The electromagnetic transducers under consideration are of the relative motion type, that is, whether the conductor is moving or the magnetic field is moving or both are moving, an output voltage will be generated. The voltage magnitude is determined by the following mathematical expression in the case of the flux being generated by a rigid permanent magnet such as pole pieces 17 and 19.

$e = NlBv$ wherein:
$e$ = induced voltage
$N$ = number of turns of the coil
$l$ = length of the conductor in the field
$B$ = flux density
$v$ = velocity of the probe The above equation describes the ideal condition for a probe type of electromagnetic transducer; however, since both the probe and the magnet are subject to vibration, the term $v$ is substituted by the term $u(t)$ which is then the probe tip velocity. The term $u(t)$ is the velocity function of the probe and the housing and is introduced into the equation since in practice a stationary magnet or case such as case 13 is impossible to achieve. When the probe tip 23 is placed in contact with a vibrating body, the tip exhibits the vibratory motion of the body and along with the coil 19 exhibits reciprocal movement within the recess 15, thereby changing the magnetic flux and providing a coil output. The problem arises in that as the probe tip 23 and the coil 25 are executing vibratory motion the housing 13 also has a tendency to exhibit vibratory motion along with the probe assembly thereby introducing an error component into the coil output signal. This error occurs because the coil output becomes a function of the movement of the probe assembly 21 and of the housing 13.

Figure 2:
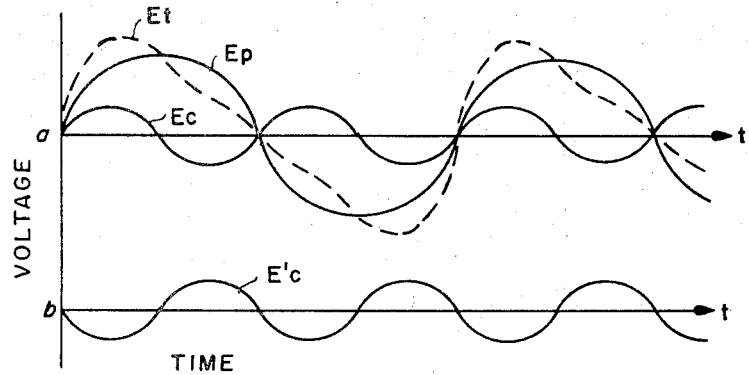
FIG. 2 shows output voltage wave forms from an electromagnetic velocity transducer.
Figure 3:
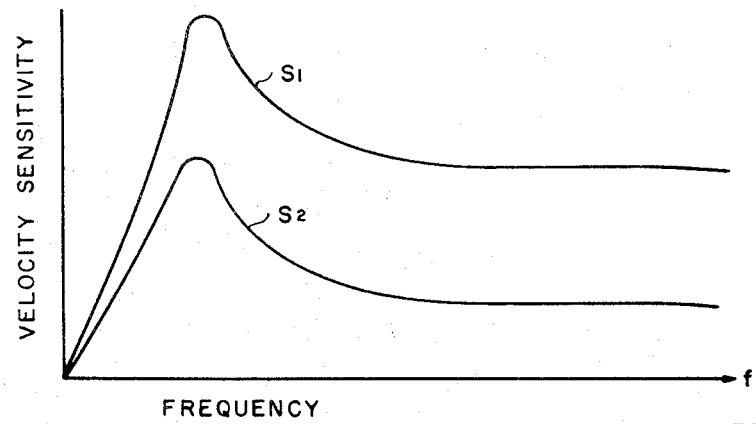
FIG. 3 shows characteristic velocity sensitivity response curves of an electromagnetic velocity transducer.

There is shown in FIG. 2a explanatory wave forms of the coil output from an electromagnetic velocity transducer, wherein the coil output is plotted versus time. The curve $Ep$ represents the coil output proportional to probe motion and the curve $Ec$ represents the coil output proportional to case motion. Therefore, the resultant curve $Et$ is the total coil output with the case motion introducing an error component into the output signal and providing a distorted output signal. This same error component is shown by the curves of FIG. 3 which are wave forms of the characteristic response curve for a probe type electromagnetic velocity transducer wherein velocity sensitivity is plotted versus frequency of vibration. The curve S1 represents the velocity sensitivity proportional to the probe motion over a predetermined frequency range and the curve S2 represents velocity sensitivity proportional to the housing motion over the same frequency range. The velocity sensitivity, $S$, is determined by the following equation:

$S = e/v$ wherein:
$e$ = output voltage
$v$ = input velocity

The velocity, $v$, is a function of the mechanical parameters of the damped spring-mass system to which an electromagnetic transducer may be reduced. The mechanical parameters of this system include the mass, the spring constants and the damping constants. The output voltage, $e$, is a function of the electrical parameters of the system which include B, N, $l$ and the air gap as previously defined. Accordingly, this invention provides compensating means having a response curve approximately the curve S2 in FIG. 3 and a voltage output approximating the curve $Ec$ in FIG. 2, wherein these curves represent the response to case motion, to cancel the error factor due to the case motion and to provide a transducer output signal proportional to probe tip velocity alone.

Figure 4:
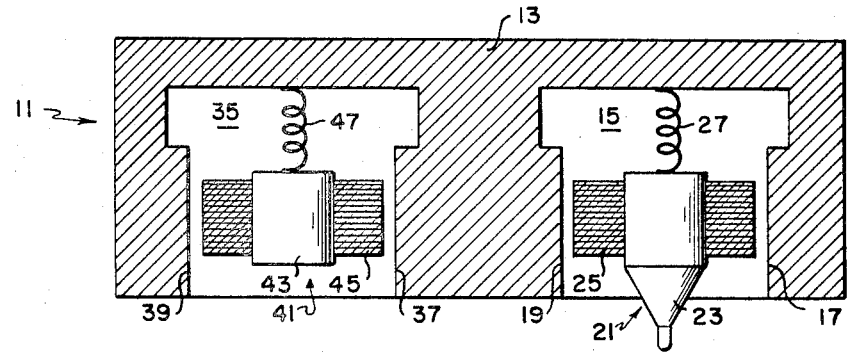
FIG. 4 is a cross-sectional view of a preferred embodiment of this invention.
Figure 6:
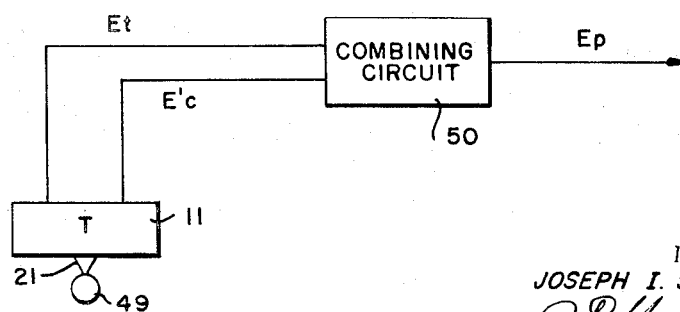
FIG. 6 is a transducer system in block diagram form.

The present invention is shown in a cross-sectional view in FIG. 4 and when taken together with the block diagram form of system shown in FIG. 6 represents an improvement in the embodiment of the prior art shown in FIG. 1. As in the prior art embodiment, a probe assembly 21 is positioned within a recess 15 in a modified form of the housing 13 by resilient means 27. As shown, the probe assembly 21 comprises a probe tip 23 and a coil 25 with the recess 15 having opposing pole faces 17 and 19. The modified case 13 provides for a second recess 35 having a second magnet assembly comprising opposing pole faces 37 and 39 for providing a magnetic field across the air gap of the recess 35. A compensating assembly 41 including a mass 43 and a coil 45 affixed thereto, is positioned within the recess by a spring 47 which may also be used as the guiding means for the vertical reciprocal movement of the compensating assembly within the recess. The probe assembly 21 contacts a vibrating specimen 49 and executes vibratory motions in the same manner as the prior art embodiment, whereby the housing 13 reacts to the vibrations of the support frame, which also supports drive motors, etc., to introduce an error component into the output of the coil 25. In the present embodiment the vibration of the housing in turn causes the compensating assembly 41 to vibrate within the recess 35 and provide a compensating output signal. In FIG. 4 the compensating assembly is mechanically isolated and essentially decoupled from the vibrating body and is designed to be responsive to the motion of housing 13.

Therefore, through proper design of this compensating mass and coil and a choice of suitable system constants, e.g., spring and damping, the system may be designed such that the compensating assembly 41 executes vibratory motion with a velocity proportional to the case motion. Hence, the output from coil 45 will approximate the curves $Ec$ in FIG. 2 and the velocity sensitivity of the compensating assembly 41 will have a response curve approximating the curve S2 in FIG. 3.

These compensating curves may be obtained either of two ways. In terms of velocity sensitivity, $S$, either the mechanical parameters, e.g., the mass, the spring constants, and the damping constants which are a function of the input velocity, $v$, may be varied while maintaining the electrical parameters constant to attain the desired characterstic curve or vice versa, the mechanical parameters may be held constant and the desired curve achieved by varying one or more of the electrical parameters of which the output voltage, $e$, is a function. Accordingly, by providing a response curve proportional to S2 in FIG. 3 the compensating coil 45 provides an output which when properly combined with the output of the coil 25 by any suitable combining circuit 50 cancels the error due to the case motion and results in an output signal proportional to probe velocity alone. FIG. 2b shows the voltage output wave form, $E'c$, from coil 45 which is proportional to the output curve $Ec$ in FIG. 2a and 180° out of phase therewith. Preferably the coil 45 is wound to provide an output voltage which is 180° out of phase with the voltage $Ec$ and thereby readily providing the proper connection for cancellation of the error component due to the housing motion.

Figure 5:
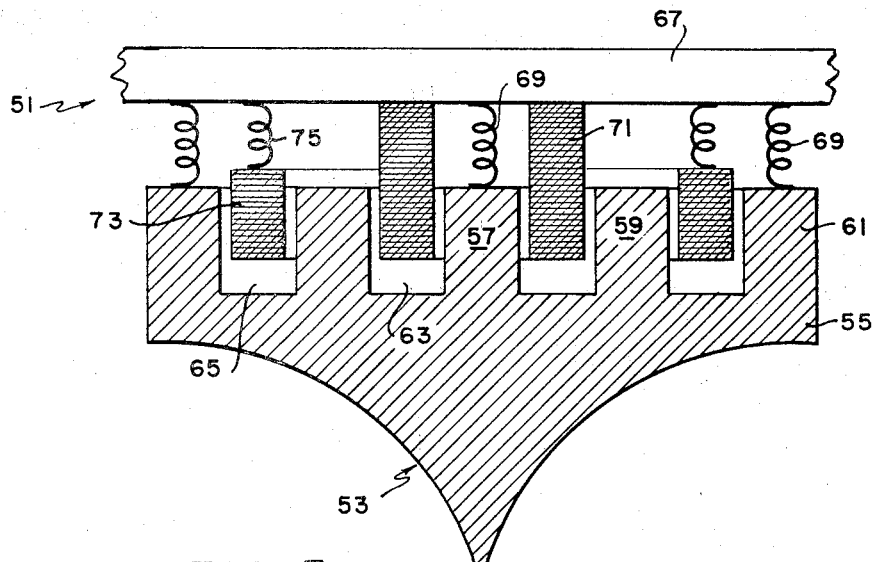
FIG. 5 is a cross-sectional view of a modification of this invention.

FIG. 5 discloses a modification of the present invention for use with a probe type of electromagnetic velocity transducer 51 wherein the magnetic portion contacts the vibrating body and becomes the vibrating member or probe tip. In this embodiment, a probe 53 having a cylindrical upper portion 55 is provided with a magnet assembly comprising a central annular magnetic pole piece 57 and first and second magnetic pole rings 59 and 61, wherein the first magnetic ring 59 is poled in opposition to the pole piece 57 and the second pole ring 61, thus defining first and second annular air gaps 63 and 65. The probe 53 is suspended from a case 67 by resilient means such as suitable springs 69. A first coil 71 is mounted on the case and is positioned within the first annular air gap 63 to provide an output signal proportional to the relative movement of the probe with respect to the coil. Here again as in the previously discussed embodiment, the movement of the probe tip in contact with the vibrating body causes the case 67 to also execute vibratory motion and thereby introduces an error signal proportional to case motion in the transducer output signal. Accordingly, a compensating coil 73 is suspended from the base by suitable resilient means such as suspension springs 75 and is positioned within the second annular air gap 65. By suitable choice of parameters, the compensating coil may be designed to provide an output proportional to case motion in the same manner as previously discussed. That is, the coil output may be proportional to case motion by maintaining either the set of electrical or the set of mechanical parameters constant and varying the other of these sets of parameters to obtain the desired output. Again, proper combination of the output from the first coil 71 and the compensating coil 73 as shown in FIG. 6 will provide an output signal proportional to the probe velocity alone.

It should be understood, of course, that the foregoing disclosure relates to only preferred embodiments of the invention and that numerous modifications or alterations may be made therein without departing from the spirit and the scope of the invention i.e., a compensating assembly for a probe type of electromagnetic velocity transducers, as set forth in the appended claim.

What is claimed is:

1. An electromagnetic velocity transducer for measuring the velocity of a vibrating specimen, said transducer comprising:
a probe for contacting said specimen for vibration therewith, said probe having a cylindrical upper portion provided with a magnet assembly which comprises;
a centrally located cylindrical magnetic pole piece of one polarity;
a first magnetic pole ring of an opposite polarity spaced from said centrally located cylindrical pole piece;
a second magnetic pole ring of said first polarity spaced from said first ring;
whereby said spaced central pole piece and said first pole ring define a first air gap and said spaced first and second pole rings define a second air gap;
a housing providing support for said probe;
resilient means suspending said probe from said housing;
a first annular coil mounted on said housing and positioned within said first air gap for reciprocal movement of said first coil with respect to said first air gap, said first coil for providing a first output signal indicative of said probe vibration;
a second annular coil having a mass responsive to the vibration of said housing providing an error component in said first output signal;
a second annular coil havng a mass responsive to the vibration of said housing for providing a second output signal proportional to the vibration of said housing;
resilient means positioning said second coil within said second air gap for reciprocal movement of said second coil with respect to said second air gap; and
means for combining said error-containing first output signal and said second output signal whereby said second output signal cancels the error component of said first output signal and provides a resultant output signal proportional only to the vibration of said probe.

References Cited

UNITED STATES PATENTS 3,164,995  1/1965  Federn et al. _____ 73—71.4 X

JAMES J. GILL, *Primary Examiner.*